United States Patent [19]

Gelardi et al.

[11] Patent Number: 5,457,843
[45] Date of Patent: Oct. 17, 1995

[54] MACHINE OPTICS AND PAPER PATH CLEANER

[75] Inventors: John A. Gelardi, Cape Porpoise, Me.; Paul J. Gelardi, Marshal Point Rd., Cape Porpoise, Me. 04014; David A. Capotosto, Cape Porpoise, Me.; Norman J. Olson, 1327 N. Carolan Ave., Burlingame, Calif. 94010

[73] Assignees: Norman J. Olson, Burlingame, Calif.; Paul J. Gelardi, Kennebunkport, Me.

[21] Appl. No.: 359,858

[22] Filed: Dec. 20, 1994

Related U.S. Application Data

[63] Continuation of Ser. No. 266,661, Jun. 28, 1994, abandoned, which is a continuation of Ser. No. 955,153, Oct. 2, 1992, abandoned, which is a division of Ser. No. 464,236, Jan. 12, 1990, Pat. No. 5,153,964.

[51] Int. Cl.⁶ ............................................ G03G 21/00
[52] U.S. Cl. ...................... 15/229.12; 15/210.1; 355/296
[58] Field of Search ............................ 15/210.1, 229.12; 355/296; 40/124.1, 539; 446/147

[56] References Cited

U.S. PATENT DOCUMENTS

| 874,010 | 12/1907 | Johnson . | |
|---|---|---|---|
| 1,592,711 | 7/1926 | Acklin | 40/158 X |
| 2,042,672 | 6/1936 | MacLean | 40/124.1 X |
| 2,886,841 | 5/1959 | Wilcox . | |
| 3,029,457 | 4/1962 | Hunder et al. . | |
| 3,069,815 | 12/1962 | Valentine . | |
| 3,335,221 | 8/1967 | Barnes et al. . | |
| 3,477,083 | 11/1969 | Park . | |
| 3,484,971 | 12/1969 | Liebman | 40/124.1 X |
| 3,577,507 | 5/1971 | Corbett . | |
| 3,706,491 | 12/1972 | Furman et al. . | |
| 4,010,514 | 3/1977 | Fischer et al. . | |
| 4,145,231 | 3/1979 | Heckman . | |

*Primary Examiner*—Christopher K. Moore
*Attorney, Agent, or Firm*—James Creighton Wray

[57] ABSTRACT

A machine optics and paper path cleaner has a relatively stiff backing sheet and a cleaning sheet attached to the backing sheet at a position spaced from the leading edge. The cleaning sheet is folded, flocked or flapped, knitted or engraved with surface variations to aid in the cleaning of paper paths and optics. Wet cleaners are held in absorbent materials and in frangible or openable reservoirs to wet the cleaning material as it is drawn into the machine through the paper path and across the optics. The cleaners are made in single foam sheets of varied thickness and in laminated sheets of stiff backing material and flexible cleaning material.

5 Claims, 5 Drawing Sheets

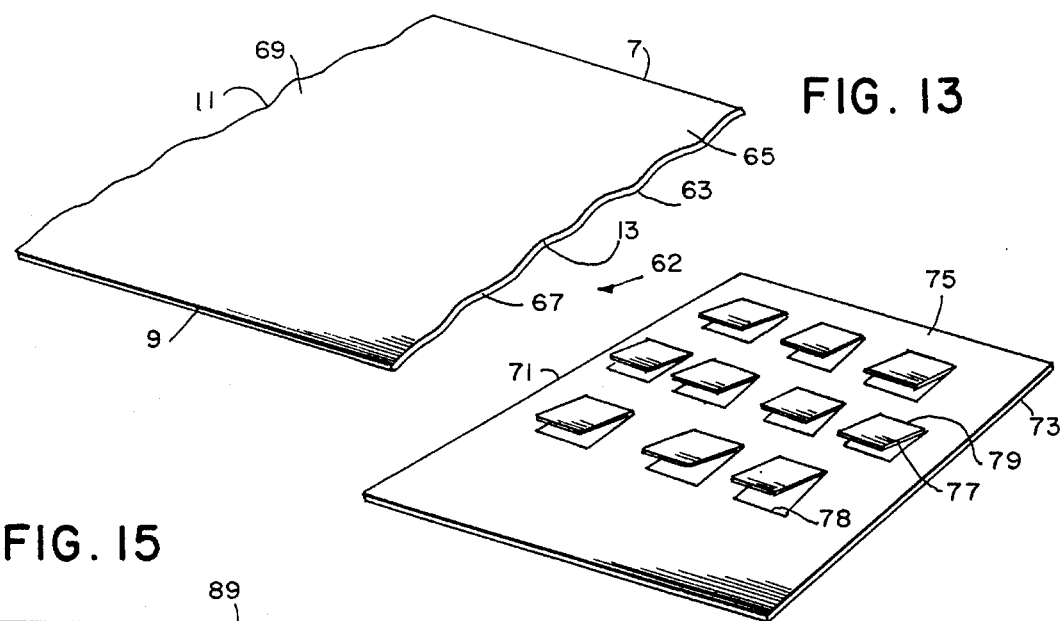
FIG. 13
FIG. 14
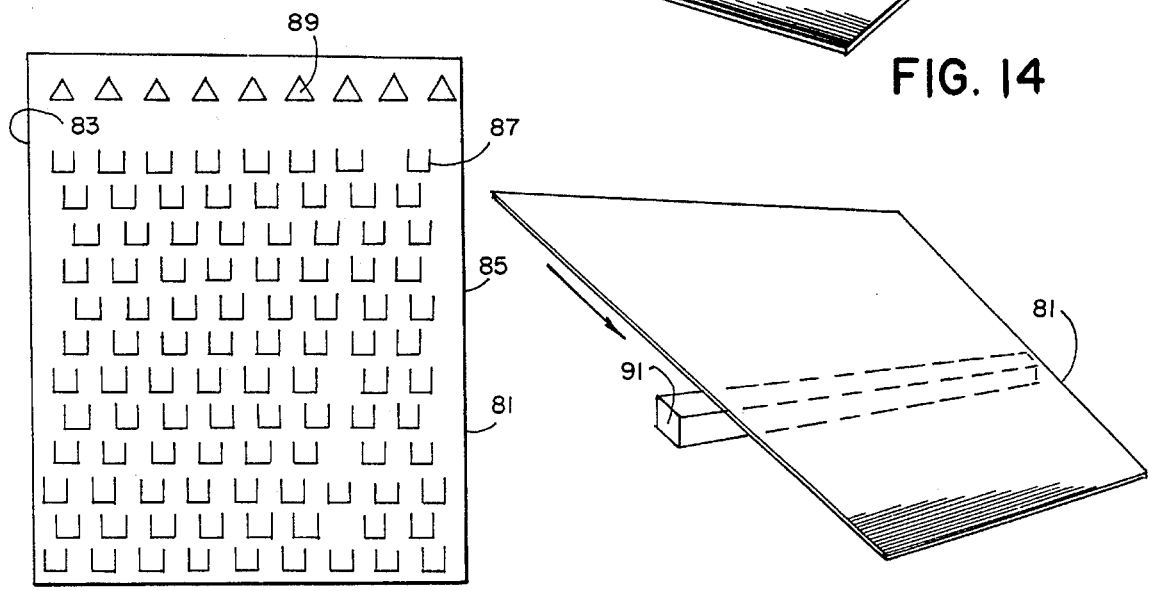
FIG. 15
FIG. 17
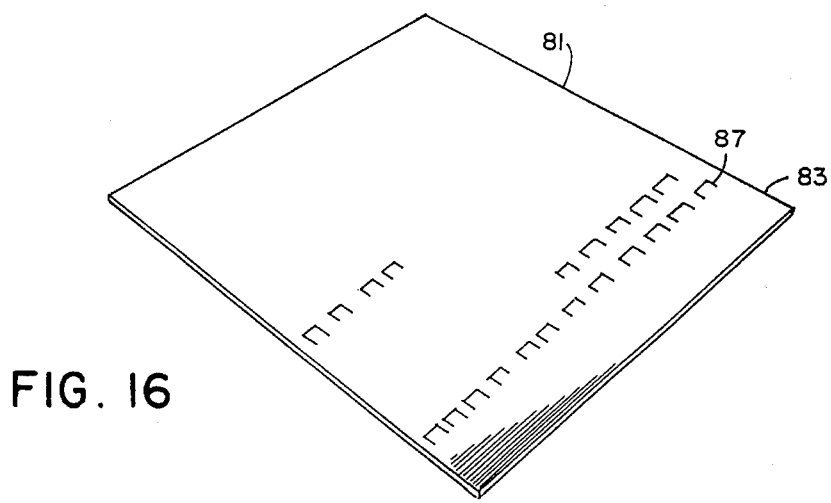
FIG. 16

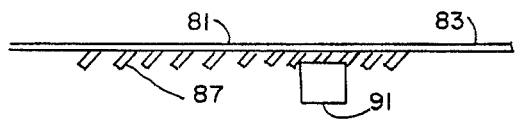
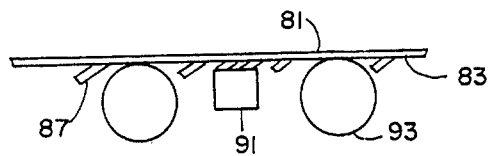
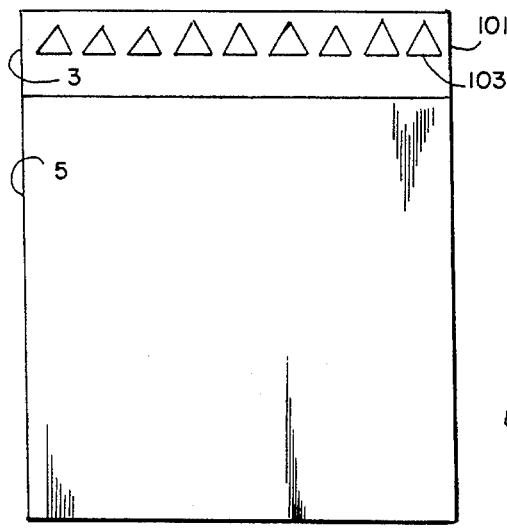
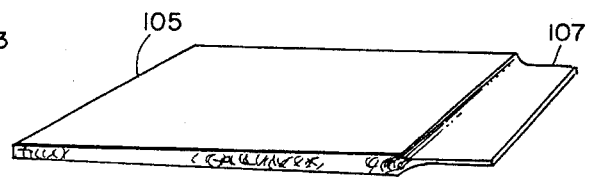
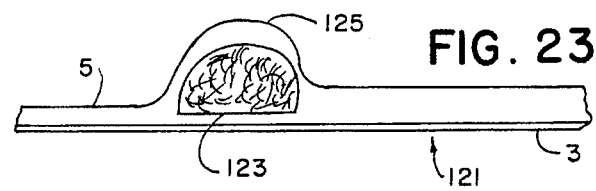
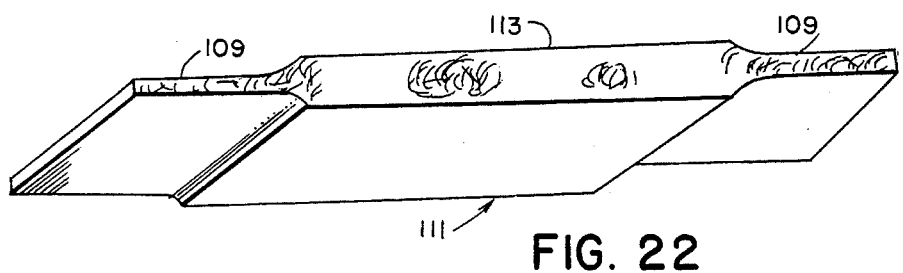
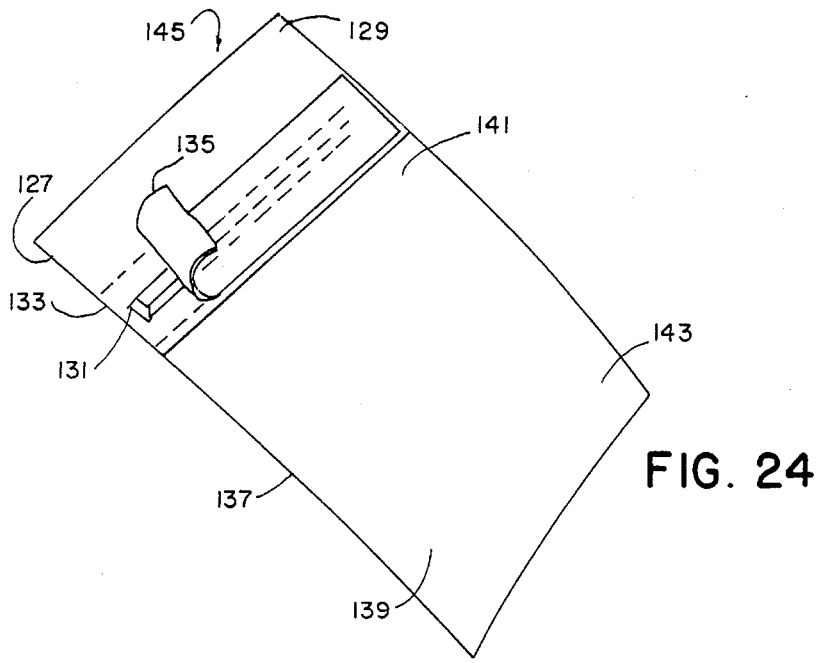

MACHINE OPTICS AND PAPER PATH CLEANER

This is a continuation of U.S. Ser. No. 266,661, filed Jun. 28, 1994, now abandoned which is a continuation of U.S. Ser. No. 955,153, filed Oct. 2, 1992, now abandoned which is a division of U.S. Ser. No. 464,236, filed Jan. 12, 1990 now U.S. Pat. No. 5,153,964, issued Oct. 13, 1992.

BACKGROUND OF THE INVENTION

Typically, a machine's paper path and optics require cleaning. Paper particles, dust, chemical paper contaminates, ink and other dirt and debris collect on the optical scanner and create streaks, smudges and lines in the machine transmission copies. Most machines require some degree of disassembly to clean the paper path and optics.

Unlike other scanners or copiers, fax machines, which are also called telecopiers and telefacsimile machines pull or push, or both pull and push documents face down over fixed narrow windows and read the documents in sequential steps. Any dirt on the windows appears to the optics as a streak or straight line on the paper, since the mark is constant as the document advances. Stepped advancement of the paper may pull accumulated debris from the paper path onto or beneath the window.

Typically a service technician is called to perform this cleaning by dissembling and wiping the paper path, window and optics. Particularly the lens or glass which covers the scanner must be cleaned with some form of cleaning solution and soft material, sponge or brush.

Among chief disadvantages are the need to disassemble the machine and the expense of calling a service technician.

A need exists to provide rapid, sure and inexpensive methods and materials for cleaning machines.

Laser printers pull or push, or both pull and push, sheets of paper through paper paths, which include a paper pickup area transfer guide and a fusing assembly area. If the paper path accumulates paper debris or if the rollers accumulate toner, the quality of the printing or the paper feeding may be encumbered. It is necessary to periodically clean laser printers.

Other machines such as copiers, printers or scanners have paper paths and feed rollers and optics, including original document platens which must be cleaned. A need exists for a simple apparatus which is capable of cleaning those machines.

In using wet cleaners to clean paper paths and optics of a machine a problem exists, in that the packaging for a cleaner product costs more than the product itself. A need exists for a low cost wet cleaner for machine optics and paper paths.

SUMMARY OF THE INVENTION

An object of this invention is to clean the path which paper takes when passing through a fax machine, or a laser printer or the like, and to clean from the workings of a machine, laser printer or the like, paper specs or other contamination which would decrease the quality of printing and scanning images.

Preferably the cleaner of the present invention is made in two layers. The first layer of the cleaner is a material which is used for cleaning optical surfaces. The cleaning material is adhered to a backing paper which is non-linting and non-debris forming. The cleaning material has at a distance from one end one or more folds across its length. The fold creates a flap which, when run through the machine, cleans described areas. More than one flap can be used. Testing shows that one flap works well. One flap may also be more economical. A regular series of folds increases the performance of the cleaner. The paper backing has information printed on its surface which contains directions for the cleaner's intended use. The cleaner is placed into the machine face up and then face down. Running the cleaner through the machine insures that contaminates are removed from top and bottom surfaces of the machine.

The purpose of the invention is to allow users of fax machines, laser printers, scanners, copiers or the like to routinely clean their machines to maintain quality images and transmissions without disassembly and without the need for a service technician. The purpose is to create a product which cleans scanners, printers and paper paths by simply passing the cleaner through the machine one or more times.

A cleaner must be able to feed into and through the machine without jamming and yet be able to fill the gap of the paper path of the machine between an opposing wall and the printer head or lens or glass over the scanner. The cleaner should fill the gap and apply pressure to the surfaces to be cleaned. It should also be somewhat abrasive, trap dirt and debris, and it may carry cleaning fluids. To feed properly, the cleaner must not be too thick and must have adequate stiffness.

The invention is a stiff, strong sheet material which has a somewhat abrasive surface which cleans and traps dirt and debris; and which can be treated to hold onto the dirt and debris. The cleaner can also absorb and carry a cleaning fluid through the machine and across the surfaces to be cleaned. The cleaner need be thick enough to fill the gap and apply pressure to the surfaces to be cleaned, and yet not be so thick as to jam in the wide array of machines which have, by design, varying gap sizes, depending upon make and model.

The preferred cleaner is constructed of one or more pieces of material which have been cut and folded to create a series of flaps which fill and gap, apply pressure to the surfaces to be cleaned and fold flat wherever the paper path narrows.

Alternatively the cleaner is a compressible material, such as a foam sheet.

The cleaner material may be paper, film, fabric or foam sheet. It is advantageous to use a substrates sheet material and to laminate a surface sheet with the appropriate surface finish or to flock the substrate sheet to create an appropriate surface finish.

A preferred cleaner is a single sheet with flaps folded in one direction. It is alternately run through the machine to clean both sides. In one form, the cleaner is two sheets folded to create flaps on both sides. Alternatively, the cleaner is a single sheet with flaps folded in both directions.

To insure structural rigidity and to provide complete contact across its width, the cleaner flaps in one embodiment are arranged in staggered rows.

The leading edge of the cleaner which is fed into the machine preferably is made without flaps, so that the cleaner can get started and can be pulled through by the fax drive mechanism. The flat in-feed zone or starter section starts the cleaner into the machine.

In an alternative foam sheet construction, a permanently compressed leading edge allows the sheet to get started into the machine. Compression of this permanently compressed leading edge is achieved by either physical, chemical or thermal means.

The preferred cleaner carries cleaning solution and also provides anti-static or static-dissipation treatment of the paper path.

In preferred form, the present invention is constructed of folded creased sheet materials, foam sheets, spunbonded nonwoven sheet, and laminated sheets.

The basic construction allows feeding and cleaning. Die cut and creased sheet materials or compressible sheet material such as a foam may be used. The sheet material may be monolayer material embodying structural surface variants, laminated material, or flocked material.

In an alternate construction a compressible sheet, such as foam, is used. It is possible to use a non-sheading, open cell foam sheet with a permanently compressed leading edge to both feed and fill the gap and to apply pressure to surfaces to be cleaned. When an open cell foam is used, it may have a somewhat abrasive surface. The foam sheet traps dirt and debris, and carries cleaning fluids to the surfaces to be cleaned.

To insure structural rigidity and yet provide complete cleaning across its width while preventing jamming braking or breaking, the cleaner flaps are arranged in staggered rows.

The machine optics and paper path cleaner apparatus comprises a stiff backing sheet and a flexible cleaning sheet attached to the backing sheet. The flexible cleaning sheet has a raised cleaning surface. The backing sheet and the cleaning sheet have rectangular planforms, with a leading edge and a trailing edge and opposite side edges. The cleaning area of the cleaning sheet begins at a position spaced from the leading edge, thereby creating a feeding portion between the leading edge and the raised cleaning surface. The cleaning sheet has increased flexibility and loft with respect to the stiffness and thickness of the backing sheet. The cleaning area of the cleaning sheet extends from the start of the cleaning area between the side edges of the sheets to the trailing edge of the sheets.

The backing sheet is a thick calendered paper or rigid film, and the cleaning sheet is a Polywipe material. The rigid film may be a polymer film, and the Polywipe material may be scan welded to the polymer film backing so that a solvent such as alcohol will not degrade the attachment.

The Polywipe sheet is folded transversely parallel to the leading and trailing edges between the side edges.

The Polywipe sheet has parallel folds which are spaced from the backing sheet.

The folds have curved radii or sharp creases.

Slots are formed in the cleaning sheet across the creases and across the folds parallel to the side edges.

The cleaning material is an industrial non-linting polymer fiber material. The polymeric material has a patterned face remote from the backing sheet. A preferred polymer fiber material comprises a knitted polymer fiber material. The backing sheet is flat, and the cleaning sheet is folded in a preferred embodiment.

The machine optics and paper path cleaner apparatus comprises a sheet material having a leading edge, a generally parallel spaced trailing edge, and two generally parallel side edges, which are generally perpendicular to the leading and trailing edges. The sheet material has a relatively thin leading portion for feeding into a machine, and a relatively thick cleaning portion spaced from the leading edge by the leading portion for following the leading portion into the machine. The cleaning portion has surface irregularities for removing debris from the machine, for trapping the debris removed from the machine, and for carrying the removed and trapped debris on the cleaning portion and out of the machine with the sheet as the sheet moves through the machine.

One cleaner comprises a foam sheet having a relatively thin leading portion and a relatively thick cleaning portion following the leading portion. The leading portion is compressed and held in compression, and the cleaning portion is relatively thick and relatively uncompressed with respect to the leading portion.

A preferred foam is an open cell foam material, and the open cells on a face clean debris from machine surfaces, entrap debris, and remove the debris from the machine.

The cleaning portion comprises at least one transverse fold extending across the cleaning portion between the side edges and parallel to the leading and trailing edges.

A cleaning liquid container within the fold releases cleaning liquid into the cleaning portion as the fold and container are compressed upon feeding through the machine. The container is a liquid-containing pouch, or the cleaning liquid container is a foam block impregnated with the cleaning liquid.

A preferred leading portion comprises a card stock paper material, or the cleaning portion comprises a diverse, relatively high loft, flexible material. The cleaning portion comprises an open cell foam material, and a polymer fiber sheet material. The polymer fiber sheet material has a regular pattern cleaning face and is made from a flexible woven material.

The cleaner portion is folded transverse to a longitudinal direction between the leading and trailing edges, and the folded material forms doubled layers of the cleaning portion when the cleaning portion is moved through the machine. The fold has sharp creases or curved radii.

Short or long slots are formed across the folds in a longitudinal direction between the leading and trailing edges and parallel to the side edges. Preferred cleaners have multiple parallel folds.

The leading portion comprises a leading section of a backing sheet, and the cleaning portion comprises a cleaning sheet fixed to the backing sheet. The backing sheet is planar and the cleaning sheet is folded. In another embodiment, the backing sheet and cleaning sheets are folded.

These and further and other objects and features of the invention are apparent in the disclosure, which includes the above and ongoing written specification, including the claims and the drawings.

BRIEF DESCRIPTION OF THE DRAWINGS

FIGS. 13 and 14 show alternate forms of the invention.

FIG. 15 is a detail of a preferred embodiment of the invention.

FIG. 16 shows a cleaner similar to that shown in FIG. 15.

FIG. 17 is an inverted view of a scanner which is being cleaned with a cleaner of the present invention.

FIG. 18 is an elevational detail of the cleaning of a scanner.

FIG. 19 shows flaps being flattened by feed rollers.

FIG. 20 is a detail of one preferred form of the invention.

FIGS. 21 and 22 show alternate forms of the invention made of a foam material.

FIG. 23 shows one form of the invention made with a backing sheet, a cleaning sheet, and a block of foam material within a fold in the cleaning sheet.

FIG. 24 shows one form of the invention made with the polymer backing sheet, a Polywipe cleaning material, an absorbent pad holding a wet cleaner, and a peel-off barrier film for removing before the cleaner is inserted in the machine.

DETAILED DESCRIPTION OF THE DRAWINGS

Figure 1:
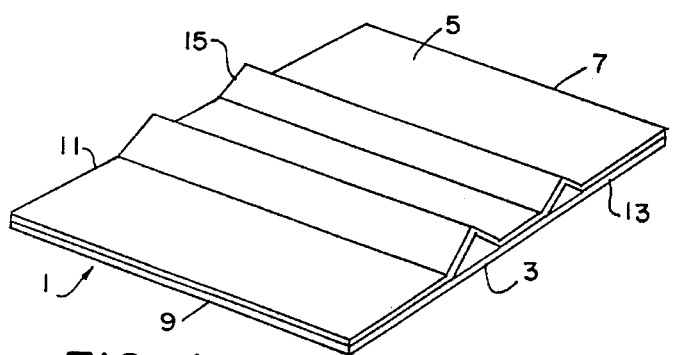
FIG. 1 is a perspective view of a preferred form of the invention.
Figure 2:
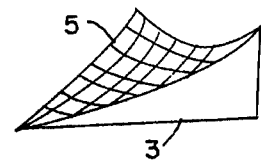
FIG. 2 is a detail of a corner of the cleaner shown in FIG. 1.

Referring to FIG. 1, a machine optics and paper path cleaner is generally referred to by the numeral 1. As shown in the detail of FIG. 2, the cleaner 1 has a backing sheet 3 made of relatively rigid material, and a cleaning sheet 5 made of a flexible, absorbent material. In one form of the invention, the cleaning material and backing material have concurrent leading edges 7 and trailing edges 9, and opposite side edges 11 and 13. One or more folds 15 are provided. The folds extend transversely in a longitudinal direction between the leading and trailing edges, and extend between the side edges 11 and 13.

In one form of the invention, the backing sheet 3 may be made of a letter sized calendered card stock paper material which supplies sufficient rigidity to carry the cleaner through the paper path of a machine to clean the optics, such as the original glass in the paper path. The more flexible and higher loft cleaning sheet 5 may be made of any suitable material, such as a strong, flexible paper sheet, and preferably is made of a fabric material formed from polymeric fibers, such as by knitting, weaving, felting or bonding. One suitable form of cleaning sheet is referred to as a Polywipe.

As shown in FIG. 1, the folds 15 may be formed in the backing sheet as well as the Polywipe material. In a preferred embodiment, as later described, the folds are formed in the cleaning sheet 5, and the backing sheet 3 in planar.

Figure 3:
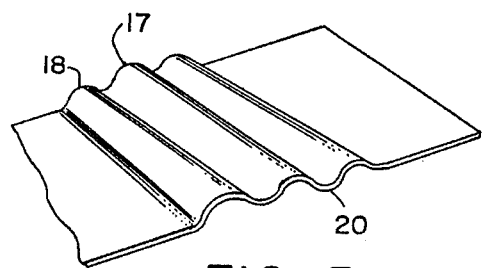

As shown in FIG. 3, the folds 17 have peaks 18 and valleys 20 formed with radii.

Figure 4:
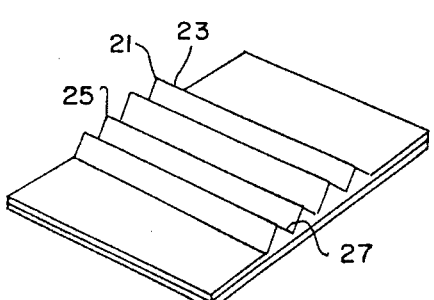
FIGS. 3 and 4 are alternate forms of the cleaner.

FIG. 4 shows folds 21 formed with sharp creases 23 at the peaks 25 and valleys 27.

As the cleaners are driven through the machines, the folds tend to compress near the rollers that drive the sheet through the machine, and the folds expand the material in other areas and drag the cleaning material over the surfaces to be cleaned. Particularly, the folds act as wipers cleaning the lens areas. One fold is sufficient. Multiple folds are preferred.

Figure 5:
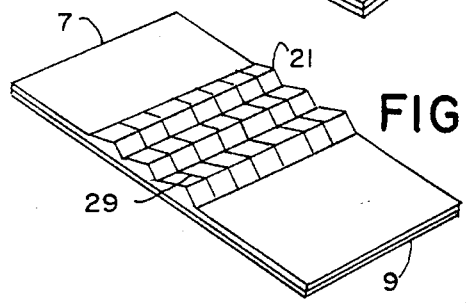
FIGS. 5 and 6 are alternate forms of the cleaner with debris-holding slots.
Figure 6:
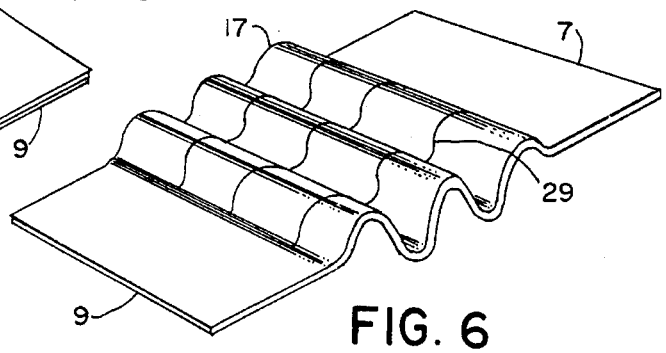

In FIGS. 5 and 6, slots 29 are formed in the folds 21 and 17. The slots are preferably formed in a longitudinal direction between leading and trailing edges 7 and 9. The slots may be closely spaced as shown in FIG. 5, or widely spaced as shown in FIG. 6. Preferably the slots separate elements of the folded cleaning sheet to facilitate and increase the cleaning action and to provide individual elements which fit within surface irregularities of the machine paper path which is being cleaned. The slots, in connection with the folds, tend to trap debris from the machine, and carry the trapped debris out of the machine.

Figure 7:
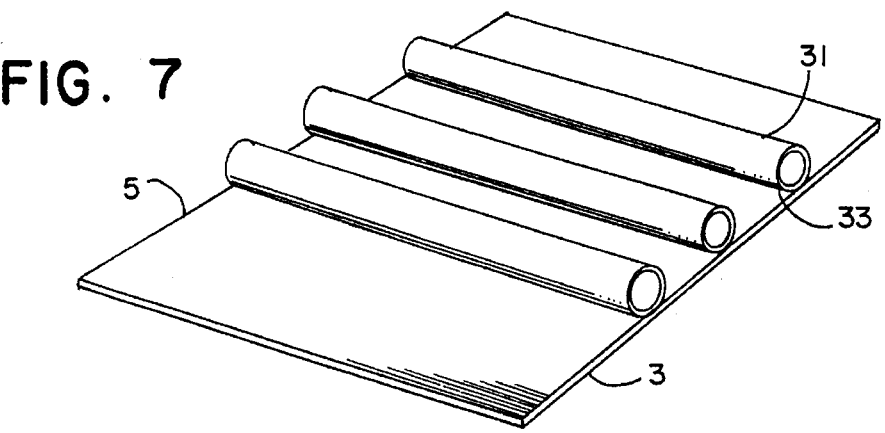
FIG. 7 shows an alternate form of the invention.

As shown in FIG. 7, the flaps 15 may be formed as loops 31 with bases 33 of the loops positioned close together. In a preferred embodiment, the cleaning sheet material 5 is bonded to the backing sheet material 3. The loops 31 are formed by uniformly bonding sections of the cleaning sheet 5 to the backing material 3, and forming the loops as the sections are sequentially bonded. The backing sheet 3 is planar.

Figure 8:
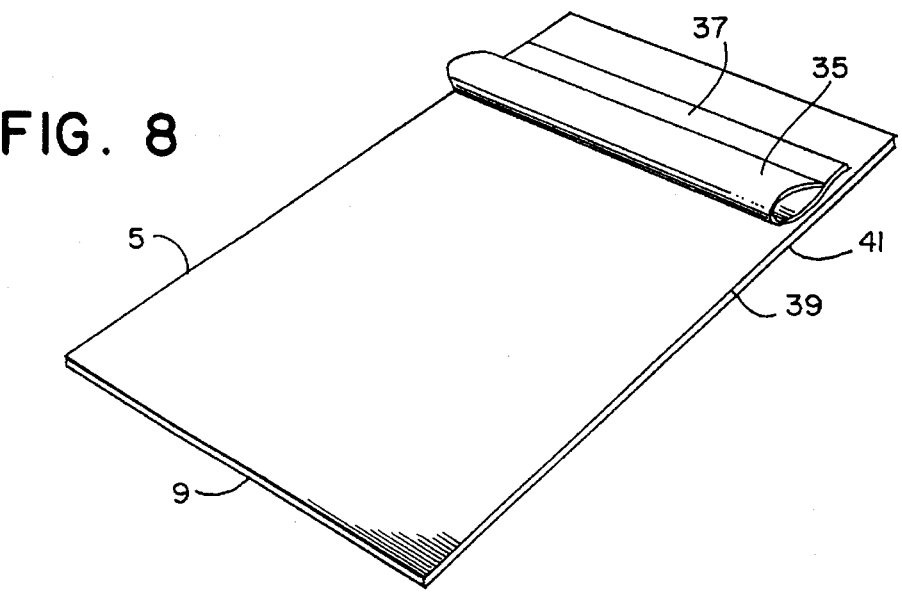
FIG. 8 is an alternate form of the invention with a separate flap.

In an alternate embodiment shown in FIG. 8, a planar backing sheet 3 has bonded thereto a cleaning material 5. In addition, a separate flap 35 is bonded at its leading portion 37 to the cleaning material 5. The cleaning material may start along the line 39 and continue to the trailing edge 9, and the flap and its leading portion 37 may be bonded directly to a leading portion 41 of the cleaning sheet.

Figure 9:
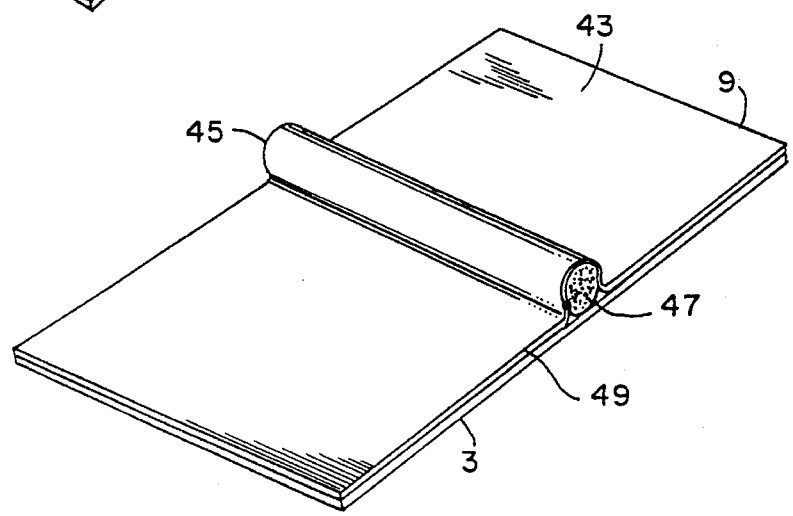
FIG. 9 is an alternate form of the invention showing a cleaning liquid holder within the flap.

An alternate form of the invention is shown in FIG. 9. A thin foam sheet 43 is bonded to the backing sheet 3 for cleaning the paper path and optics. A flap 45 has a container 47 therein, which releases a liquid cleaner as it is compressed. The longitudinal nature of the flap and container 47 tend to spread the liquid cleaner entirely across the trailing portion 49 of the cleaning sheet 43.

Figure 10:
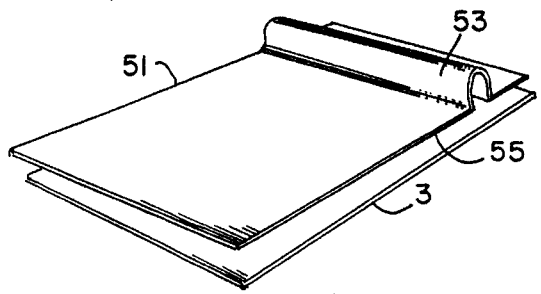
FIGS. 10, 11A and 11B and 12 are details of alternate forms of the invention.
Figure 11B:
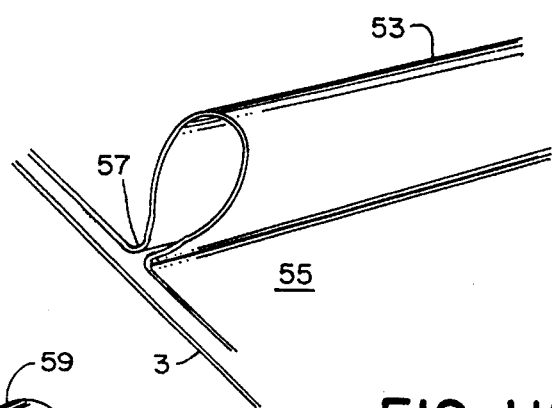
Figure 11A:
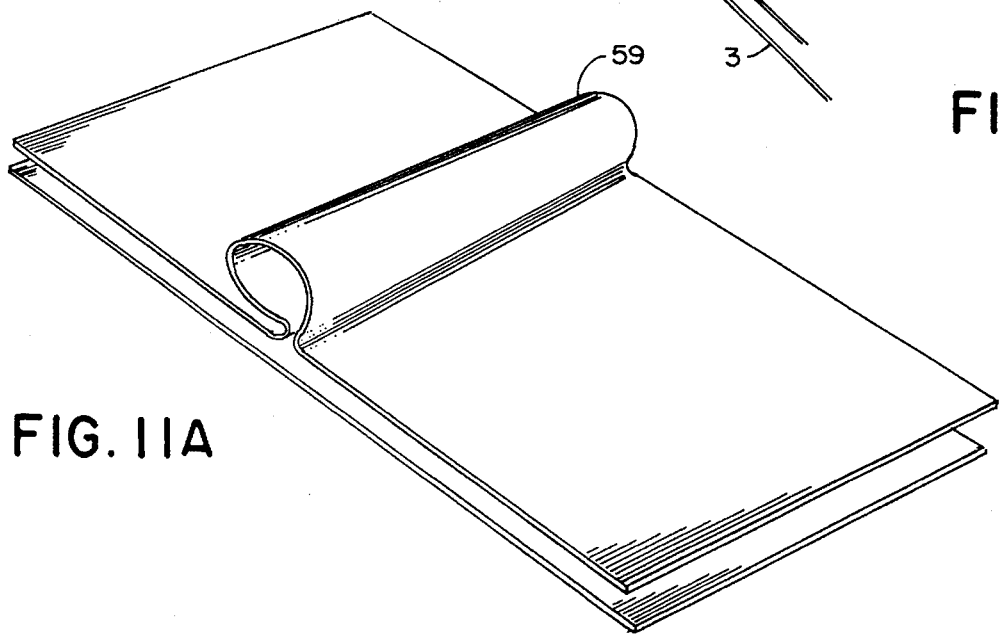

As shown in FIG. 10, a preferred form of the cleaner 51 is made of a single loop 53 of a cleaning sheet 55 adhered to a backing sheet 3. The loop 53 is shown in FIG. 11B. The loop is formed by juxtaposing lower edges 57 when bonding the cleaning sheet 55 to the backing sheet 3. In an alternate form of the invention shown in FIG. 11A, the cleaning flap 59 is formed in the center of the cleaning sheet.

Figure 12:
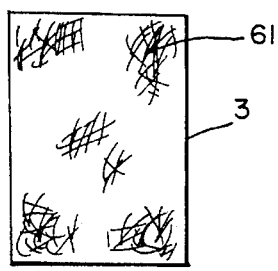

As shown in FIG. 12, directions for use are provided on the lower face 61 of the backing sheet 3.

The embodiment shown in FIG. 13 uses embossed paper to form the cleaner 62. The embossed paper may form the backing sheet 63 or the cleaning sheet 65. In one preferred embodiment, a layer of embossed paper 67 is provided between a planar backing sheet and the upper cleaning material 65. The cleaning material 65 takes on the ridged shape of the embossed paper 67. The ridges 69 on the embossed cleaner 62 are transverse to the cleaning direction between the leading edge 7 and the trailing edge 9, and extend between opposite sides 11 and 13.

As shown in FIG. 14, a cleaner 71 is made with a backing sheet 73 and a cleaning sheet 75, with a series of die cut flaps on the cleaning sheet. The cleaning sheet 75 may be a paper laminate, but is preferably a fabric wipe as previously described. The flaps are joined along integrally formed hinges 79 which are left uncut. The flaps preferably are staggered to ensure complete cleaning. The severed edges 78 of the flaps tend to trap and carry away debris from the paper path. A preferred die cut sheet is shown in FIG. 15. Cleaner 81 has a backing sheet 3 with a leading portion 83. The cleaning portion 85 is formed of a cleaning sheet 5, which has staggered die cut flaps 87. Alternately, the cleaning sheet 85 may extend to the leading edge 7. Arrows 89 are imprinted on the leading portion 83 to indicate the appropriate direction of feed.

In FIG. 16 a cleaner 81 similar to the cleaner sheet shown in FIG. 15 has flaps 87 formed over approximately one third of the sheet. The portion 83 at the leading edge of the sheet is devoid of cleaning flaps 87.

As shown in FIG. 17, the cleaner 81 is fed into a machine having an optical scanner 91. The scanner and sheet are shown upside down. Powered rollers and free rollers propel sheet 81 through the machine in a step-by-step movement by scanner 91. In FIG. 18, the cleaner 81 carries the flaps 87 into contact with the scanner 91. The flaps wipe the surface of the scanner, removing any debris from the surface, trapping the debris and carrying it out of the machine. The flaps also clean film from the surface of the scanner, providing bright optics.

FIG. 19 is a schematic representation of the drive rollers 93 which move the cleaner 81 over the scanner 91. The flaps 87 are shown folded flat in the plane of the cleaner 81 when passing over the drive roller. In usual embodiments of machines, the scanner has a glass plate facing upward, and the sheet to be copied is moved along the glass plate by one or more drive rollers 93. Backing rollers are usually provided in a hinged cover to ensure that the sheet feeds smoothly and squarely across the scanner glass. Alignment belts and sheet separators and single sheet feeders may be provided at the entrance to the machine. For those reasons, the leading portion 83 of the cleaner 81 is devoid of the cleaning flaps 87.

As shown in FIG. 20, a preferred cleaner 101 comprises a relatively rigid card stock backing sheet 3 and a cleaning sheet 5. The cleaning sheet 5 is bonded to the upper surface of the backing sheet 3. The preferred cleaning sheet is formed of a knitted polymeric fibrous non-lint-forming industrial wipe material. A leading portion 103 of the backing sheet 3 acts as a feed portion of the backing sheet to ensure the backing sheet and cleaner 101 are drawn into the machine before the cleaner sheet 5 is drawn into the machine. The knitted surface of the cleaner sheet 5 cleans the scanner glass, trapping and removing any debris, and wiping and polishing the glass as the cleaner 101 is drawn through the machine.

An alternate form of the invention is shown in FIG. 21, in which a rectangular foam sheet 105 has a compressed leading portion 107, which draws the open cell foam sheet into the cleaner. The open cell foam sheet may have a hardened or abrasive surface which cleans the machine but which will not scratch glass. The cells aid in the trapping of dirt and debris, and carry cleaning and anti-static fluids through the machines, wiping the surfaces to be cleaned with the dampened surface of the foam.

As shown in FIG. 22, reduced thickness areas 107 and 109 are formed on both ends of the cleaner 111 so that the cleaner may be fed in either direction through the machine. The ends of the machine may be cut or routed or shaped thinner than the body 113, or may be permanently compressed by chemicals or heat.

In an alternate form of the invention shown in FIG. 23 the cleaner 121 has a backing sheet 3 and a cleaning sheet 5 made of the woven industrial wipe material shown in FIG. 20. A rectangular or semicircular foam block 123 is inserted in a loop 125. Upon compressing the foam block, liquid flows through the industrial wipe material of the cleaning sheet to moisten the material with a cleaning liquid to aid in the cleaning of the scanner glass on the paper path of the machine.

One form of the invention is shown in FIG. 16 in which a stiff film polymer backing sheet 127 has a leading portion 129, which is devoid of cleaning material. A thin foam block mounted on the next adjacent area 133 of the backing sheet 127 contains a wet cleaner. A peel-off barrier film strip 135 is removed just before the leading edge 127 is fed into a machine. The peel-off barrier 135 and the polymeric film 127 act as upper and lower barriers to prevent leaking or evaporation of the wet cleaner before the barrier strip 135 is removed.

The remaining area 137 of the cleaner is covered by a Polywipe cleaning material 139, which is scan welded to the underlying area 137 of the stiff polymer film 127. As the foam strip 131 is compressed while drawing the cleaner through a machine, a liquid is released from the foam and is absorbed by the Polywipe material as it is passed through the machine paper path. The leading portion 141 of the Polywipe material is damp and the trailing portion 143 is dry as the cleaner sheet 145 moves through the machine.

In preferred methods of use, the sheet in inserted in the machine with the cleaning material 5 facing in the direction of print in normal use. The cleaner is run through the machine once with the cleaning material 5 facing the optics of the machine, and then is again inserted with the cleaning material facing away from the optics of the machine. Desirably, the cleaning sheet is then inverted and fed again into the machine for cleaning the optics, and is reversed and fed into the machine, dragging the backing sheet over the optics surface. The cleaner is discarded and the machine is again ready to be used. The cleaner may be used with a machine or a laser printer, or any other machine which feeds sheet material through a scanning or printing head.

While the invention has been described with reference to specific embodiments, modifications and variations of the invention may be constructed without departing from the scope of the invention, which is described in the following claims.

I claim:

1. A machine optics and paper path cleaner apparatus, comprising a backing sheet and a cleaning sheet attached to the backing sheet, the backing sheet and the cleaning sheet having a leading edge and a trailing edge and opposite side edges, and having plural transverse folded pleats parallel to the leading and trailing edges between the side edges.

2. The apparatus of claim 1, wherein the backing sheet is a thick material and the cleaning sheet is a Polywipe material and wherein the backing sheet and the cleaning sheet are flexible.

3. The apparatus of claim 1, wherein the folded pleats have a curved radii.

4. The apparatus of claim 1, wherein the folded pleats have creases.

5. The apparatus of claim 4, further comprising slots formed in the cleaning sheet across the creases parallel to the side edges.

* * * * *